Patented Aug. 20, 1940

2,212,432

UNITED STATES PATENT OFFICE 2,212,432

CHEMICAL COMPOSITION

Robert L. Brandt, New York, N. Y., assignor to Colgate-Palmolive-Peet Company, Jersey City, N. J., a corporation of Delaware No Drawing. Application November 20, 1937, Serial No. 175,740

2 Claims. (Cl. 99—103)

This invention relates to methods of washing fruits and vegetables, such as apples, pears, citrus fruits, string beans, beans, lettuce and the like to remove spray materials from the surface thereof, and to novel compositions in the form of aqueous solutions which are suitable for such purposes. More particularly, the present invention is directed to the removal of such substances as arsenic or lead compounds which may be associated with mineral oils and have been used as such in various combinations for spraying fruit trees to eradicate certain insect pests. The invention is also applicable to the treatment of waxy fruit and the like which may not have been oil sprayed, but in which the spray residues have become embedded in the wax.

In view of the extremely poisonous effects of even small amounts of certain compounds contained in spray materials, it is customary for fruit growers and handlers to endeavor to remove such substances by washing, wiping, dipping flotation methods and the like. Recently, however, the Government has lowered the tolerance on the content of both arsenic and lead on fruit for edible purposes so that it has become increasingly essential that a more thorough washing operation be utilized to effectively remove all traces of these materials. Moreover, additional difficulties are met when a mineral oil is used for spraying purposes, as it may stimulate the formation of a resistant waxy covering on the fruit which prevents the ready access of the washing solution and thus tends to prevent effective cleaning of the fruit and concomitant removal of the lead, arsenic or other undesirable compounds present. It is therefore seen to be highly important that a thorough, yet economical, method of washing fruit be developed, which is satisfactory under any of the conditions ordinarily encountered in the preparation of fruit for market and is capable of removing any undesirable constituents or residues of the kinds hereinbefore mentioned.

A number of methods of washing sprayed fruit have been devised and used, but they have only been indifferently successful and have not always served to bring the arsenic and lead content down below the relatively small amount allowed by the Government. One of these processes, for example, consists in preparing a solution of hydrochloric acid with an emulsion of kerosene, heating the solution to about 100° F. and washing the fruit therein. This procedure, however, failed to remove the arsenical residue sufficiently from fruit sprayed with mineral oil, fish oil, or fish oil soaps and lead arsenate to meet the export or domestic market requirements.

Another previously proposed process consists in first dipping the fruit in a methyl alcohol solution to remove the coatings of oil or wax which form on the fruit, after which the fruit is subjected to a cleaning operation with a hydrochloric acid solution. This process offered serious difficulties in that it was necessary to conduct two separate washing operations which greatly increased the cost of processing because of the need for maintaining additional washing equipment. The methyl alcohol may also have detrimental effects on the health of workers who are subjected to prolonged exposure to the alcoholic vapors.

Still another process of the prior art resides in the use of such detergents as trisodium phosphate, sodium carbonate or sodium silicate in solution for washing fruit and the like. These substances, however, do not remove the lead from the fruit to a satisfactory degree in all cases, and the solutions must be heated to from 90° to 100° F. in order to make them at all effective.

The present invention is directed to methods of washing fruit with a solution which is comparatively inexpensive and is capable of effectively removing the arsenical and lead residues or the like from fruit which has been sprayed with lead arsenate and oil or with similar mixtures. Furthermore, it is concerned with the production and use of various compositions which have been found suitable for carrying out the above operations or for removing other materials, such as fluorine residues.

It is accordingly among the objects of this invention to provide a solution for washing fruit which has a sufficiently high solvent action to remove the undesirable residues from the fruit without the necessity of applying heat, which in no way detrimentally affects the keeping qualities or appearance of the fruit, which does not endanger the health of the workers, which is non-inflammable in nature, and which is suitable for use with either the homemade flotation washers and dipping tanks or for use with the various types of commercial washing machines in which a short period of contact between the fruit and the washing solution is maintained.

In practicing the present invention, a dilute aqueous solution of an acid, base or salt, or other material capable of exerting a solvent action on the spray residues, or capable of decomposing or removing such residues, is prepared, and to this solution is added a small amount of a degumming or wetting agent of the type which is made by reacting sulphonating agents upon certain portions or derivatives of mineral oil. The resulting solution may be used without further treatment or the addition of other ingredients, and in some instances it is even possible to successfully wash the fruit with the use of a solution of the degumming agent alone, yet it has been found preferable to incorporate a small quantity of a water soluble salt, such as sodium chloride or sodium sulphate, in the solution, as such substances tend to increase the wetting action of the sulphonates employed. Moreover, it has been found advisable to incorporate in the solution a substance adapted to prevent foaming, since excessive foaming may result in overflowing of the froth from the apparatus and consequent loss of washing solution. This is particularly true under circumstances where considerable foaming is apt to occur, as, for example, where washing apparatus employing positive agitation is utilized. While a considerable number of substances of various types may be used as anti-foaming agents, it has been found that substances such as aliphatic ketones and alcohols having from six to ten carbon atoms, pine oil, fusel oil, degras, naphtha, or mixtures thereof, are the most suitable, and usually need be employed in but comparatively small amounts.

Among the materials which are more or less suitable as solvents for the spray residues may be mentioned various acids, such as hydrochloric, nitric, sulphuric, sulphurous, phosphoric and boric, or organic acids, such as malic, citric, tartaric, acetic, oxalic, tannic, and carbonic; numerous bases, such as sodium, potassium, calcium and ammonium hydroxide, sodium carbonate and bicarbonate, soda ash and soda lime; and various salts, such as sodium, potassium, ammonium, calcium and ferric chloride, sodium nitrate, acetate, chromate, borate, phosphate and thiosulphate, calcium acid phosphate, and aluminium, ferric and copper sulphate as well as alkali silicates. It is also possible to use mixtures of any of these compounds as well as materials, such as cane sugar, glucose, alcohol, sodium stearate and oleate and potassium benzo sulphate. It has been found, however, that certain of the inorganic acids and bases, for example hydrochloric and nitric acids and sodium hydroxide and soda ash, when used alone, are the most effective and at the same time the most economical.

The degumming agents which are used in the washing solutions in accordance with the present invention are prepared by the methods described in my copending applications S. N. 117,096 and S. N. 138,463, which have matured into patents 2,149,661 and 2,149,662, respectively, reference being made thereto for a more complete disclosure than is herein given. According to the method described in application S. N. 117,096, the mineral oil to be treated, preferably a lower viscosity raw distillate of a naphthene base crude, such as a Texas Gulf Coast crude, is first extracted with liquid sulphur dioxide, liquid sulphur dioxide plus benzol, or other preferential solvent, such as furfural, phenol, nitrobenzene, a propane-cresylic acid mixture, or the like. The extracted material is then dissolved in liquid sulphur dioxide, or since the extracted material is already in sulphur dioxide solution as a result of the solvent extraction process, the next step may consist in diluting the solution with as much sulphur dioxide as may be necessary to prepare for the subsequent steps in the process, usually with twice the volume of extracted material, it being understood that the presence of sulphur dioxide as a diluent permits rapidity of contact and lower operating temperatures and also exerts a catalytic effect on the reaction. The resulting solution is then cooled, say to −15° C., and mixed with a sulphonating agent, such as fuming sulphuric acid, sulphur trioxide, chlorsulphonic acid or the like, or a solution of such an agent, such as a solution of 20% oleum in liquid sulphur dioxide, while vigorously agitating and keeping the temperature quite low, preferably below −5° C. Upon completion of the mixing and after the evolution of heat has substantially ceased, the reacting mixture is usually raised to a temperature somewhat higher than that at which the original mixing took place, for example +5° C., and the agitation continued for a sufficient length of time to complete the reaction. The original mixing is ordinarily accomplished in a few minutes, after which the agitation may be continued for a period varying from a few minutes to an hour and a half or more. When the treatment with the sulphonating agent has been completed, the sulphur dioxide is removed by evaporation, preferably at or below the treating temperature, the remaining material is diluted with cold water, generally with twice its volume, and is neutralized with a basic compound, such as caustic soda, soda ash, ammonia, triethanolamine, lime, and the like. During the dilution with cold water, it is preferable, although not essential, that the temperature be maintained below about 20° C.

Although the products obtained in the above manner are suitable for use in the fruit washing solutions without further treatment, it has been found preferable, either before or after neutralization, to wash the products with a low boiling hydrocarbon solvent, such as a Pennsylvania grade saturated gasoline, as this yields products having the highest wetting powers. Hydrocarbons of this nature are especially useful for this purpose, as they are readily removable and are capable of readily dissolving any impurities or products of undesirable side reactions, such as resins, polymerized hydrocarbons, coloring matter, oil-soluble sulphonic acids, thio compounds, and the like, which may be present.

The methods described in application S. N. 138,463 are similar in many respects to the procedure outlined above, but are adapted to be performed either by batch methods or in a continuous manner, and include certain additional steps which may be carried out either before or after the extraction, although it is preferred to carry them out after the extraction. For example, the boiling range of the portion of the oil to be sulphonated may be further narrowed by additional fractionation of the oil after extraction or by additional or more specific fractionation prior to extraction and discarding the fractions from at least one end of the boiling range. The oil to be used for sulphonation may also be treated, at any time prior to the sulphonation, with caustic soda to remove certain undesirable acidic constituents, with sulphuric acid to remove asphalt-like and highly reactive bodies and water, and with contact clay to assist in sludge removal.

According to the above application, the extraction step may also be varied somewhat, as it was observed that improved wetting agents are obtained, when the temperature is kept relatively low, i. e. between −15° and +15° C., during that phase of the process. If desired, also, the final neutralized products obtained in accordance with any of these methods or variations may be extracted with isopropyl, butyl or other substantially water-insoluble alcohol to remove any inorganic sulphate formed, although it is preferable to omit this step in the present invention, as the presence of water-soluble sulphates or other inorganic salts has been found to improve the action of the degumming agents.

As an example of one of the methods described in application S. N. 138,463, a distillate from Texas Gulf Coast crude boiling between 130° C. and 350° C. at 5 mm. pressure and having a Saybolt viscosity of 80 seconds at 100° F., may be counter-currently extracted with approximately an equal volume of liquid sulphur dioxide by the usual Edeleanu process, the sulphur dioxide separated from the extract and the extract then fractionally distilled, in vacuum, in the presence of about 0.1% of its weight of caustic soda. The fraction boiling between 220° and 240° C. at 5 mm. pressure may be treated with about 1% of its weight of 92% sulphuric acid by mixing it therewith for about forty-five minutes. Most of the sludge will settle out at once, but the remainder which is known as "pepper" sludge has a tendency to remain in suspension and it will usually be found desirable to remove this sludge by treating the material containing the same with an amount of contact clay in the neighborhood of 0.2% by weight of the material being treated, and then heating the mixture to 130° to 150° C. while out of contact with air. Upon filtering, the oil will be found bright and clear.

The desired fractions of the extract having been obtained, they may individually or collectively be sulphonated by dissolving them in approximately from one to two times their volume of liquid sulphur dioxide, cooling to around −15° C. and adding, over a period of about 15 minutes, an amount of 20% oleum about equal in weight to that of the material to be sulphonated. Vigorous agitation is practically a necessity during this operation and the use of a jacketed autoclave, provided with a stirring device, thermometer and pressure gauge has been found desirable. Considerable heat is evolved during and immediately after the addition of the acid, but temperature control can be maintained by circulating a cooling fluid through the jacket. The temperature should preferably not be permitted to rise above about −5° C. After the acid addition, the temperature should be allowed to rise to +5° C., and maintained at that point for about one and a half hours to three hours, depending on the type of oil, the agitation being continued. At the end of this period the sulphur dioxide may be separated as a vapor, by releasing the pressure at a temperature below +5° C.

To finish the preparation, the substantially sulphur dioxide free material may be mixed with twice its volume of ice-water, keeping the temperature below +20° C. There is a considerable amount of heat evolved at this step on account of the heat of dilution of the acids. After dilution, the aqueous solution or dispersion should be immediately batch-washed several times with 20% of its volume of gasoline, all of which is volatile below 250° F. It can then be neutralized with caustic soda, soda ash, or other neutralizing agent, and, finally, dried on soap-drying rolls at a roll temperature of 250° F.

Although improved results may be obtained by sulphonating extracts having a boiling range as large as about 150° C., it has been found preferable to employ an extract or oil having a boiling range as narrow as 40° C., or even as narrow as 20° C., as such substances yield sulphonates of the highest quality which are most suitable for wetting and other similar purposes.

It will be understood that the percentage of ingredients in the washing solutions may be considerably varied. For example, the solvent used, preferably hydrochloric acid, is generally added in quantities not exceeding 3 per cent by weight, although occasionally as high as 5 per cent may be employed. It is preferred, however, to utilize amounts varying from 1 to 2 per cent. The amount of degumming agent present is usually not over 2 per cent by weight, and preferably percentages varying between 0.5 and 1.0 per cent, or even lower, are employed. When a soluble salt is used in conjunction with the degumming agent, it is not necessary to add more than about 1 to 2 per cent thereof, while an even smaller proportion of anti-foaming substance is all that is required, as ordinarily not over 0.5 per cent thereof is used and in most cases from 0.1 to 0.2 per cent is sufficient to prevent foaming.

The actual washing of the fruit or other material is ordinarily conducted at normal atmospheric temperatures, say for example about 70° F., although in prior processes it was considered essential to heat the solutions. The washing operation may be conducted for any desired length of time within the usual limits employed in fruit washing methods. For instance, in the spray and flood type of washing machines the fruit may be held in contact with the acid solution for about one-half to one minute. In the commercial type of washer heating to 100° F., for a short time assists in the removal of spray residues in a shorter time but heating is not at all essential. With the homemade flotation type of washing machine the period of contact may be on the average of about three minutes followed by thorough rinsing in water.

It has been found that the efficiency of washing operations as applied to fruit which has been heavily sprayed with such substances as lead arsenate and calcium caseinate, or with lead arsenate and petroleum oil, is very materially increased by the use of a degumming or wetting agent as disclosed herein, due to the rapid and effective contact established between the hydrochloric acid or other solvent and the lead arsenate. This is probably due to the rapid removal from the surface of the fruit of the oil or the outer film of the wax in which the spray residues are embedded, allowing the hydrochloric acid to make direct contact with the lead arsenate and dissolve the same. Moreover, with the use of this invention, the washed fruit shows no deleterious effects after long storage and the surface of the fruit is bright and clear.

Although the sulphonation products obtained according to any of the methods herein described are very suitable for the purposes of the present invention, the preferred degumming agents are obtained by means of the methods described in my copending application S. N. 138,463 rather than by the methods described in application S. N. 117,096. All the sulphonation products referred to have a strong deterging, wetting, foaming, frothing and emulsifying action, and are useful in modifying capillary action and lowering surface tension, yet the products described in application S. N. 138,463 have been found superior in these qualities and are therefore more effective in fruit washing solutions.

In this specification the term "sulphonation" has been used in its broad sense to mean the reaction of sulphuric acid upon the oil products and not merely the formation of one class of chemical compounds. Furthermore, the details of the sulphonation process, such as the quantities of the reagents, their concentrations and the time period and temperatures for the reaction are but examples of satisfactory constants for a particular type of oil. As the type of oil is varied, as it may be within the scope of this invention, these various factors will necessarily vary, but the application of the general principles set forth herein, and the varying of these factors in accordance with the needs of the particular situation are within the concepts of this invention.

Although this invention has been described setting forth the general nature thereof and indicating the various materials and proportions which have been found adapted for commercial practice, it is to be understood that the invention is not limited to the details described herein. It will be apparent to those skilled in the art that variations of the strength of solutions, in the time of contact of the fruit with the solutions, and the type and character of the apparatus used for washing, may be made at will with good results. The character and the amount of spray, as well as the length of storage of the fruit prior to the washing operation, may necessitate wide variation in the composition of the washing solution and in the time of treatment.

I claim:

1. A method of washing fruits and vegetables to remove spray material from the surface thereof, comprising applying thereto an aqueous solution of a mineral acid containing a small proportion, not in excess of 3 per cent by weight, of a composition prepared by fractionally distilling, solvent extracting, caustic, acid and contact clay treating mineral oil, so as to produce a material boiling around 220 to 240° C. at 5 mm. pressure, said solvent extraction being performed at around −15° to +15° C., by the use of liquid sulphur dioxide, which tends to dissolve certain constituents of the oil and not to dissolve others, the constituents which the solvent tends to dissolve being generally those of an unsaturated nature, including those of an aromatic nature, thereafter treating the material, while in solution in liquid sulphur dioxide, with a sulphonating agent, washing the product with a substantially saturated hydrocarbon solvent substantially all of which volatilizes below 250° F., and neutralizing the washed sulphonation product.

2. A method of washing fruits and vegetables to remove spray material from the surface thereof, comprising applying thereto an aqueous solution at a temperature of about 70° F., said aqueous solution consisting, in addition to water, of the following ingredients in substantially the proportions specified:

| | Per cent by weight |
|---|---|
| Hydrochloric acid | 1 to 2 |
| Degumming agent | 0.5 to 1.0 |
| Anti-foaming substance | 0.1 to 0.2 | said anti-foaming substance being selected from the group consisting of aliphatic ketones and alcohols having from six to ten carbon atoms, pine oil, fusel oil, degras, naphtha and mixtures of said substances; and said degumming agent being a composition prepared by fractionally distilling, solvent extracting, caustic, acid and contact clay treating mineral oil, so as to produce a material boiling around 220 to 240° C. at 5 mm. pressure, said solvent extraction being performed at around −15° to +15° C., by the use of liquid sulphur dioxide, which tends to dissolve certain constituents of the oil and not to dissolve others, the constituents which the solvent tends to dissolve being generally those of an unsaturated nature, including those of an aromatic nature, thereafter treating the material, while in solution in liquid sulphur dioxide, with a sulphonating agent, washing the product with a substantially saturated hydrocarbon solvent substantially all of which volatilizes below 250° F., and neutralizing the washed sulphonation product.

ROBERT L. BRANDT.